United States Patent
Beers et al.

(10) Patent No.: US 10,072,502 B2
(45) Date of Patent: Sep. 11, 2018

(54) TURBINE NOZZLE AND SHROUD FOR AIR CYCLE MACHINE

(71) Applicant: Hamilton Sundstrand Corporation, Windsor Locks, CT (US)

(72) Inventors: Craig M. Beers, Wethersfield, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1348 days.

(21) Appl. No.: 13/869,050

(22) Filed: Apr. 24, 2013

(65) Prior Publication Data
US 2014/0321963 A1    Oct. 30, 2014

(51) Int. Cl.
| | |
|---|---|
| *F01D 25/24* | (2006.01) |
| *F01D 5/00* | (2006.01) |
| *F01D 5/28* | (2006.01) |
| *F01D 9/04* | (2006.01) |
| *F01D 5/14* | (2006.01) |
| *F02C 1/02* | (2006.01) |

(52) U.S. Cl.
CPC .............. *F01D 5/005* (2013.01); *F01D 5/288* (2013.01); *F01D 9/045* (2013.01); *F01D 5/141* (2013.01); *F02C 1/02* (2013.01); *F05D 2230/80* (2013.01)

(58) Field of Classification Search
CPC .......... F01D 5/005; F01D 5/141; F01D 5/147; F01D 5/288; F01D 9/041; F01D 9/045; F01D 9/048; F01D 17/141; F05D 2230/80; F05D 2230/90; F05D 2240/128; F05D 2240/226; F05D 2240/95; F02C 1/02
See application file for complete search history.

(56) References Cited

U.S. PATENT DOCUMENTS

| | | | |
|---|---|---|---|
| 3,972,644 A | 8/1976 | Johnson | |
| 4,726,101 A | 2/1988 | Draghi et al. | |
| 4,798,515 A | 1/1989 | Hsia et al. | |
| 5,142,778 A * | 9/1992 | Smolinski .............. | B23K 26/00 219/121.66 |
| 5,249,934 A * | 10/1993 | Merritt ................ | F04D 29/5853 417/406 |
| 5,299,909 A | 4/1994 | Wulf | |
| 5,309,735 A * | 5/1994 | Maher, Jr. .............. | B64D 13/00 417/406 |
| 5,311,749 A * | 5/1994 | McAuliffe ................ | F02C 3/32 415/12 |
| 5,522,134 A * | 6/1996 | Rowe ...................... | B23P 6/005 29/402.08 |
| 5,630,700 A | 5/1997 | Olsen et al. | |
| 6,109,867 A | 8/2000 | Portefaix | |

(Continued)

*Primary Examiner* — Ninh H Nguyen
(74) *Attorney, Agent, or Firm* — Carlson, Gaskey & Olds, P.C.

(57) ABSTRACT

A nozzle and shroud for use in an air cycle machine has a plate and a shroud curving in a first axial direction about a center axis of the shroud relative to the plate. A plurality of vanes extends in a second axial direction away from the plate. The plurality of vanes extends for a height away from the plate and a width defined as the closest distance between two adjacent vanes, with a ratio of the height to the width being between 1.3653 and 1.7992. An air cycle machine and a method of repair are also disclosed.

6 Claims, 2 Drawing Sheets

(56) References Cited

U.S. PATENT DOCUMENTS

| | | | |
|---|---|---|---|
| 6,789,315 B2* | 9/2004 | Marques | B23P 6/002 228/119 |
| 6,942,183 B2 | 9/2005 | Zywiak | |
| 7,322,202 B2 | 1/2008 | Zywiak et al. | |
| 7,779,644 B2 | 8/2010 | Decrissantis et al. | |
| 8,016,551 B2* | 9/2011 | Lin | F01D 9/045 415/163 |
| 8,113,787 B2* | 2/2012 | Barril | F01D 5/288 416/224 |
| 8,347,647 B2 | 1/2013 | McAuliffe et al. | |
| 2012/0156028 A1* | 6/2012 | Colson | F01D 25/28 415/208.2 |

* cited by examiner

TURBINE NOZZLE AND SHROUD FOR AIR CYCLE MACHINE

BACKGROUND

Air cycle machines are known and, typically, include one or more turbines which receive a compressed air source, and are driven to rotate. The turbines, in turn, rotate a compressor rotor. Air is conditioned by the air cycle machine and moved for use in an aircraft cabin air conditioning and temperature control system.

The turbines are typically provided with a nozzle and shroud which controls the flow of air upstream and downstream of a turbine rotor.

SUMMARY

A nozzle and shroud for use in an air cycle machine has a plate and a shroud curving in a first axial direction about a center axis of the shroud relative to the plate. A plurality of vanes extends in a second axial direction away from the plate. The plurality of vanes extends for a height away from the plate and a width defined as the closest distance between two adjacent vanes, with a ratio of the nozzle height to the nozzle width being between 1.3653 and 1.7992. An air cycle machine and a method of repair are also disclosed.

These and other features may be best understood from the following drawings and specification.

DETAILED DESCRIPTION

Figure 1:
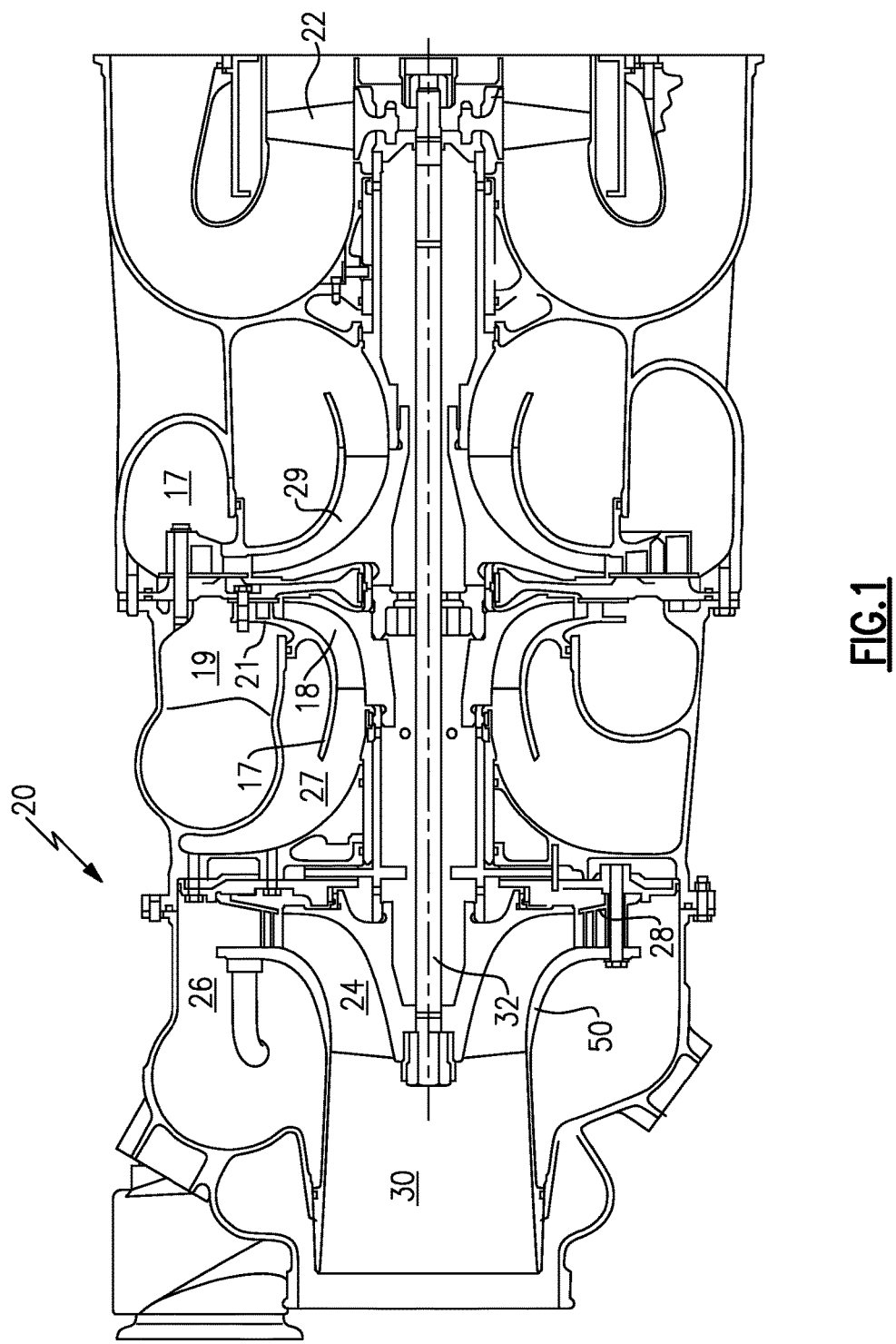
FIG. 1 shows an air cycle machine.

FIG. 1 shows an air cycle machine 20. A first stage turbine rotor 18 includes a nozzle and shroud assembly 21 conditioning air for passage across the rotor 18. A shroud portion 17 curves away and beyond the rotor 18. A compressor inlet 17 receives a source of compressed air and delivers it across a compressor rotor. The compressed air passes into an inlet 19, and to the first stage turbine rotor 18, and then to an outlet 27. The outlet 27 communicates with an inlet 26 which passes the air across a second stage turbine rotor 24. The second stage turbine rotor 24 delivers the air to an outlet 30. The outlet 30 may communicate with an aircraft cabin. A shaft 32 drives the compressor rotor 29 and the fan rotor 22 as driven by the turbine rotors 18 and 24. A nozzle and shroud combination 50 is associated with rotor 24.

Figure 2A:
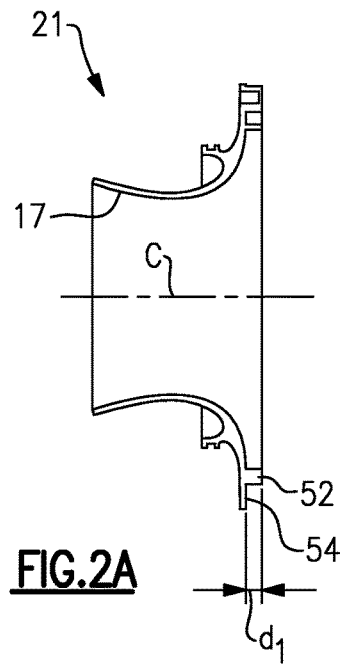
FIG. 2A shows a shroud and nozzle.

FIG. 2A shows the shroud and nozzle combination 21. As shown, a shroud portion 17 extends in a first direction away from a plate 54 relative to a center axis C. The vanes 52 are shown extending in an opposed direction from the plate 54 compared to the shroud 17. The vanes 52 extend for a distance $d_1$ or a height measured parallel to center axis C away from plate 54. As is clear from FIG. 1, the shroud extends to be downstream of rotor 18, while the vanes 52 are upstream.

Figure 2B:
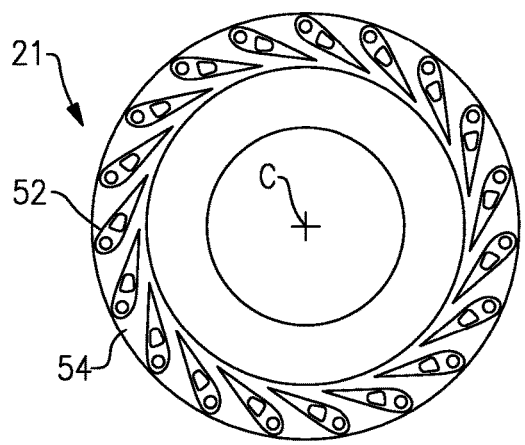
FIG. 2B is a front view of the FIG. 2A nozzle.

FIG. 2B shows the nozzle and shroud combination 21 having the plate 54 and the plurality of vanes 52 circumferentially spaced about the center axis C.

Figure 2C:
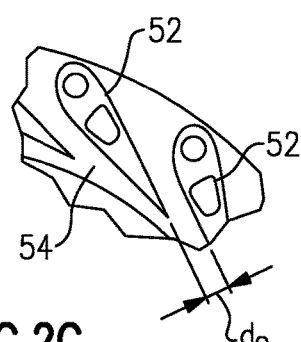
FIG. 2C shows a detail.

FIG. 2C shows adjacent vanes 52 spaced at a closest distance by a dimension $d_2$ or a width. The $d_2$ is measured tangent, or parallel to the sides of the airfoils or vanes 52.

In an embodiment, there were 19 circumferentially spaced vanes 52. The height $d_1$ was 0.400 inch (1.016 centimeters). The width $d_2$ was 0.255 inch (647.7 centimeters). A total nozzle flow area, measured at a location of $d_2$ and through $d_1$ across all 19 vanes was 1.938 square inches (12.503 square centimeters).

In embodiments, a ratio of $d_1$ to $d_2$ was between 1.3653 and 1.7992. The total nozzle flow area ranged from 1.6802 to 2.2141 square inches (10.840-14.284 centimeters).

The nozzle and shroud 121 has a tungsten carbide erosion coating. The nozzle and shroud 121 is formed of a base of aluminum and then provided with a tungsten carbide erosion coating. Preferably, a high velocity oxy fuel coating technique is provided utilizing continuous burning.

A method of repairing the air cycle machine 20 includes the steps of removing a nozzle and shroud combination 21 from a location adjacent a first stage turbine rotor 18. The removed combination is replaced by a replacement nozzle and shroud combination 21.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A nozzle and shroud for use in an air cycle machine comprising:
    a plate and a shroud curving in a first axial direction about a center axis of said shroud relative to said plate;
    a plurality of vanes extending in a second axial direction away from said plate, with said plurality of vanes extending for a height away from said plate and a width being defined as the closest distance between two adjacent vanes, with a ratio of said height to said width being between 1.3653 and 1.7992;
    wherein there are 19 circumferentially spaced ones of said vanes; and
    wherein a total flow area is defined between all 19 of said vanes and said total flow area being between 1.6802 to 2.2141 square inches (10.840-14.284 centimeters).

2. The nozzle and shroud as set forth in claim 1, wherein said plate and said shroud are formed of a base aluminum material provided with a tungsten carbide erosion coating.

3. An air cycle machine comprising:
    a first stage turbine rotor and a second stage turbine rotor, said first and second stage turbine rotors being configured to drive a shaft, and a compressor rotor driven by said shaft, and a fan rotor driven by said shaft;
    a shroud and nozzle combination provided adjacent said first stage turbine rotor with said nozzle being at a location upstream of said first stage turbine rotor, and said shroud curving to a location downstream of said first stage turbine rotor and said shroud and nozzle including a plate and a shroud curving in a first axial direction about a center axis of said shroud relative to said plate;
    a plurality of vanes extending in a second axial direction away from said plate, with said plurality of vanes extending for a height away from said plate and a width being defined as the closest distance between two adjacent vanes, with a ratio of said height to said width being between 1.3653 and 1.7992;
    wherein there are 19 circumferentially spaced ones of said vanes; and wherein a total flow area is defined between all 19 of said vanes and said total flow area being between 1.6802 to 2.2141 square inches (10.840-14.284 centimeters).

4. The air cycle machine as set forth in claim 3, wherein said plate and said shroud are formed of a base aluminum material provided with a tungsten carbide erosion coating.

5. A method of repairing an air cycle machine comprising the steps of:
   (a) removing a nozzle and shroud combination from a location adjacent a first stage turbine rotor in an air cycle machine, and replacing said removed shroud and nozzle combination with a replacement shroud and nozzle combination;
   (b) the replacement nozzle and shroud combination including a plate and a shroud curving in a first axial direction about a center axis of said shroud relative to said plate, and a plurality of vanes extending in a second axial direction away from said plate, with said plurality of vanes extending for a height away from said plate and a width being defined as the closest distance between two adjacent vanes, with a ratio of said height to said width being between 1.3653 and 1.7992;
   wherein there are 19 circumferentially spaced ones of said vanes; and
   wherein a total flow area is defined between all 19 of said vanes and said total flow area being between 1.6802 to 2.2141 square inches (10.840-14.284 centimeters).

6. The method as set forth in claim 5, wherein said plate and said shroud are formed of a base aluminum material provided with a tungsten carbide erosion coating.

* * * * *